W. COOPER.
PRESSURE RELIEVING DEVICE.
APPLICATION FILED DEC. 6, 1907.
920,729.
Patented May 4, 1909.
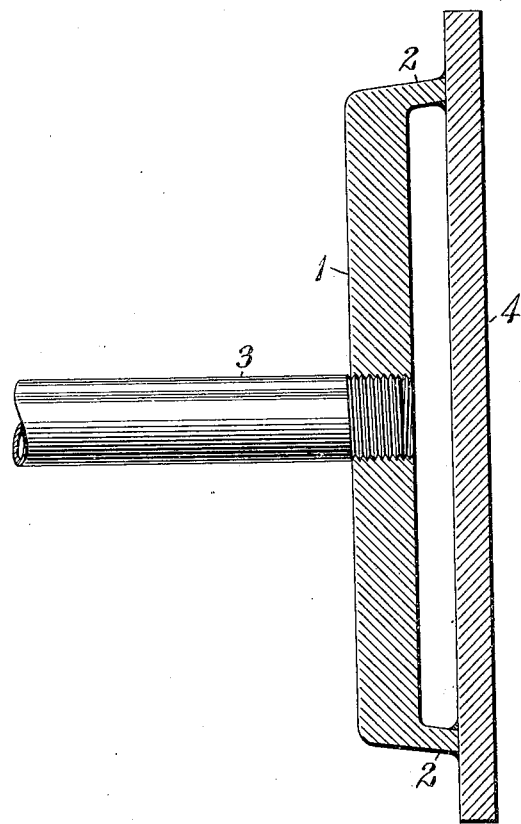
WITNESSES:
Fred H Miller
Birney Hines
INVENTOR.
William Cooper
BY R. F. Dearborn
ATTORNEY

UNITED STATES PATENT OFFICE.

WILLIAM COOPER, OF PITTSBURG, PENNSYLVANIA.

PRESSURE-RELIEVING DEVICE.

No. 920,729.  Specification of Letters Patent.  Patented May 4, 1909.

Application filed December 6, 1907. Serial No. 405,386.

*To all whom it may concern:*

Be it known that I, WILLIAM COOPER, a citizen of the United States, and a resident of Pittsburg, in the county of Allegheny and State of Pennsylvania, have invented a new and useful Improvement in Pressure-Relieving Devices, of which the following is a specification.

My invention relates to fluid pressure relieving devices, and it has for its object to provide a device of this character that shall be simple and durable in construction and reliable and effective in operation.

It is often desirable to provide means for automatically relieving the pressure in tanks or boilers when a predetermined internal pressure is exceeded. Various means for accomplishing this result have been suggested in the prior art, including safety valves and other similar devices, but none of them are adapted for use with a boiler or pressure receptacle, such as is employed in a system of refrigeration similar to that illustrated and described in my co-pending application Serial No. 405,385, filed of even date herewith. In systems of this kind, the pressure exceeds a safe value only under very extraordinary circumstances and it is then desirable to effectively and permanently relieve the internal pressure, until necessary repairs can be effected by a competent party. The problem is complicated by reason of the fact that the pressure-relieving device must be capable of continuously resisting the tendency of ammonia gas to force its way through and escape under normal pressures so that devices in which a thin film, diaphragm or bursting plate is utilized are obviously unsuitable.

The single figure of the accompanying drawing is a sectional elevation of a device constructed in accordance with my invention.

Referring to the drawing, the device here illustrated has the general form of a cup or tray and comprises a metal disk 1 having an annular flange 2, the outer edge of which is finished into a plane surface; a connecting pipe 3 and a cover plate 4. The cover plate 4 is a metal disk which is of sufficient size to fit over the opening of the cup, making a tight joint with the finished edge of the annular projection 2. The pipe 3 is tapped through the wall of the cup and is intended to communicate with the tank or boiler for which protection, against excessive pressures is desired.

The plate or disk 4 is sealed or secured to the edge of the projection 2 by a brazing or soldering process, the brazing material being of sufficient tensile strength to sustain working pressures within the cup. The pressure at which the two parts will be separated may be determined, not only by the composition and physical properties of the brazing material, but also by the size of the cup and the thickness of the annular projection 2.

One advantage in the device of my present invention lies in the fact that the parts may easily be resoldered or sealed together again after an excessive pressure has actuated the device, thereby the necessity of replacing the entire device or any one of its constituent parts is avoided. Another advantage results from the considerable thickness of material maintained at every point in the walls of the device, thereby obviating the leakage therethrough of such fluids as ammonia gas, which readily permeate thin metal parts. The brazing or soldering material is never fused or melted, but is only ruptured by reason of a direct pressure tending to pull the parts of the device asunder.

It is conceivable that the contour of the device may be varied and that many modifications in size and arrangement may be effected within the scope of my invention, and I desire that only such limitations be imposed as are indicated in the appended claims.

I claim as my invention:

1. A pressure relieving device comprising a cup communicating with a source of pressure, and a plate or disk sealed over the opening in the cup by a material having a relatively low tensile strength.

2. A pressure relieving device comprising a plate having an annular projection the edge of the projection being finished into a single plane, a source of pressure communicating with the cup thus formed, and a plate or disk fitted against the plane edge of the projection and normally held in position by brazing.

3. A fluid-pressure relieving device comprising a plurality of parts brazed or soldered together with a material of relatively low tensile strength.

4. A fluid-pressure relieving device in which the resistance to opening is secured by a material of lower tensile strength than the integral parts of the device.

5. A fluid-pressure relieving device comprising two parts fitted together and held in position by brazing or soldering with a material of relatively low tensile strength.

6. A fluid-pressure relieving device comprising a plurality of parts sealed together with a material of relatively low tensile strength.

7. A pressure-relieving device comprising a cup or chamber, a plate of material thickness fitted over the opening therein, and means comprising a suitable brazing material for holding the plate in position until the pressure in the chamber exceeds a predetermined amount.

8. A pressure-relieving device comprising a shallow cup or chamber having its edges finished into a single plane, a plate of material thickness fitted over the opening in the cup or chamber, and an annular strip of solder for holding the plate in position by adhering to the plate and to the walls of the cup or chamber.

In testimony whereof, I have hereunto subscribed my name this 4th day of Dec., 1907.

WILLIAM COOPER.

Witnesses:
R. J. DEARBORN,
BIRNEY HINES.